Dec. 8, 1964   G. STEINLEIN   3,160,252
AUTOMATIC CLUTCH WITH SPEED RESPONSIVE PILOT CLUTCH
Filed Dec. 7, 1960   3 Sheets-Sheet 3

INVENTOR
Gustav Steinlein

By Richard Ernst
Agt 3,160,252
AUTOMATIC CLUTCH WITH SPEED RESPONSIVE PILOT CLUTCH
Gustav Steinlein, Forsthaus, Mainberg, near Schweinfurt, Germany, assignor to Fichtel & Sachs A.G., Schweinfurt (Main), Germany, a corporation of Germany
Filed Dec. 7, 1960, Ser. No. 74,251
Claims priority, application Germany, Dec. 30, 1959, F 30,204
6 Claims. (Cl. 192—35)

This invention relates to automatic clutches, and more particularly to an automatic clutch arrangement suitable for motorbikes and similar vehicles having engines of relatively small displacement.

Centrifugal clutches of various types have previously been employed in automotive vehicles to provide semi-automatic clutch engagement and disengagement at predetermined rotary speeds of a clutch member. The known types of centrifugally actuated semi-automatic clutches are not applicable to the vehicles for which the instant invention is primarily intended in which the clutch should preferably be arranged on a countershaft rotating at a speed substantially lower than that of the engine crankshaft.

At the low countershaft speed available, the weights required to overcome the coupling springs of the clutch by their centrifugal effect would be out of proportion with the overall bulk and weight of the engine and of the coupling. A semi-automatic centrifugal coupling, moreover, still needs to be actuated by the operator of the vehicle even though he does not provide the motive force for disengaging or engaging the clutch. This force is only small in a clutch which transmits the torque of a relatively weak engine, and little would be gained if a manual clutch actuator were replaced by a manual control element that actuates a centrifugal coupling.

It is an important object of the invention to provide a clutch arrangement for a vehicle of the type described which is fully automatic in its operation.

Another object is the provision of an automatic clutch which is light in weight and occupies little space.

A further object is the provision of such a clutch which is of rugged and simple construction.

With these and other objects in view, the invention mainly consists of a clutch arrangement having a first and a second clutch member rotatable about a common axis. One of these clutch members has a radially extending coupling face for engagement with a corresponding face of a pressure member which is threadedly movable on the other clutch member. The arrangement includes control means actuated by centrifugal force which are responsive to differences in rotary speed between the clutch member, and which threadedly move the pressure member on the other clutch member in such a manner that, depending on the relative speed of the clutch members, the coupling faces on the first-mentioned clutch member and on the pressure member are moved toward and away from each other.

Other more specific features of the invention will become apparent to those skilled in the art as the disclosure is made in the following detailed description of preferred embodiments of the invention as illustrated in the accompanying drawing in which.

Figure 1:
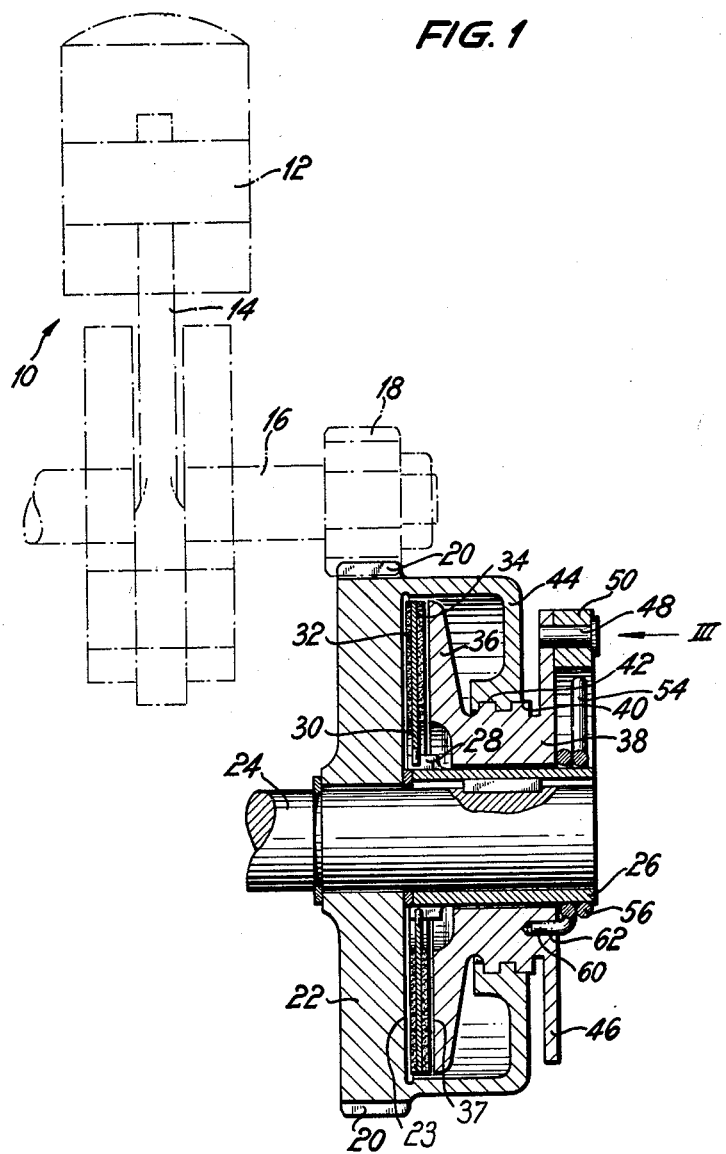
FIG. 1 shows a first embodiment of the clutch arrangement of the invention in side-elevational axial section on the driving shaft.

Referring now to the drawings, wherein like reference characters designate like or corresponding parts throughout the several views, there is shown in FIG. 1 an internal combustion engine 10, only those elements of the engine being outlined in a phantom view which cooperate more directly with the clutch arrangement of the invention.

The engine 10 includes a piston 12 which drives a crankshaft 16 by means of a connecting rod 14. A pinion 18 on the crankshaft 16 meshes with a gear rim 20 on the periphery of a bowl-shaped driving or first clutch member 22. The clutch bowl 22 is freely rotatable but not axially movable on a shaft 24 which constitutes a driven member of a power transmitting train connecting the clutch arangement with the wheels of a vehicle.

A sleeve 26 is splined to the shaft 24. It axially abuts against the rotatable clutch bowl 22 and secures the axial position of the latter. Radial projections 28 on the sleeve 26 engage corresponding slots in a clutch disk or second clutch member 30 and permit axial movement of the disk on the sleeve 26, but secure the disk against rotation relative to the shaft 24. The two radially extending faces of the disk 30 are respectively covered with friction facings 32 and 34 respectively arranged opposite corresponding coupling faces 23, 37 on the clutch bowl 22 and on a pressure plate 36, the hub 38 of which supports the face portion of the pressure plate 36. The hub 38 is formed at the end opposite to the pressure plate 36 with a disk 46, and the body 38, 36, 46 is slidable and freely rotatable on the sleeve 26.

The hub 38 of the pressure plate 36 has a substantially cylindrical outer surface into which a shallow-pitched square thread 40 is cut. The thread 40 matingly engages a corresponding thread 42 on a front face of a rim flange 44 which is integral with the clutch bowl 22. The threads 40 and 42 are coaxial with the shaft 24. The bowl 22 and flange 44 define a cavity in which the disk 30 and the coupling faces 23, 37 are enclosed. The inner face of the bottom of the bowl is formed as the coupling face 23.

A portion of the hub 38 axially spaced from the thread 40 carries a disk 46 which supports an auxiliary clutch or coupling mechanism. This clutch mechanism includes a centrifugal weight 50 pivoted to the disk 46 by means of an axially elongated pivot pin 48.

Figure 3:
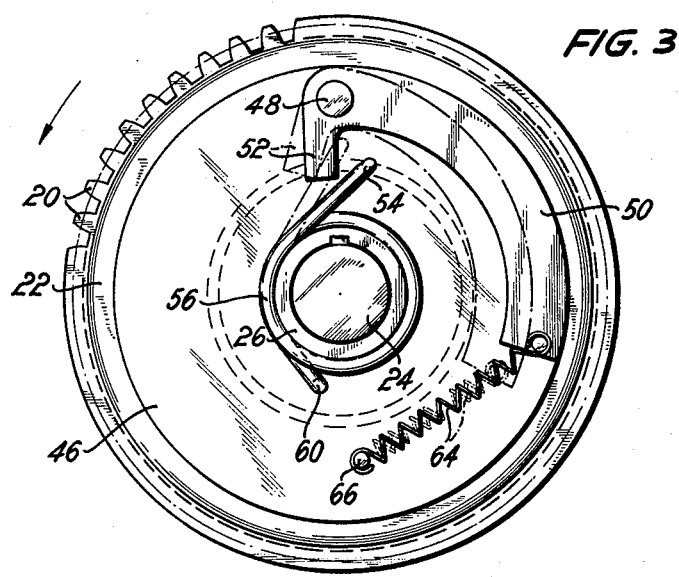
FIG. 3 shows the device of FIG. 1 in front elevation, the view being taken in the direction of the arrow III in FIG. 1.

As better seen from FIG. 3, the centrifugal weight 50 has the shape of a bell crank lever having a short straight arm 52 and a long arm which is arcuately bent. The short lever arm 52 abuts against a free end 54 of a helical spring 56 which is coiled in a few turns about the sleeve 26. The other end 60 of the spring 56 is held in an axial blind bore 62 in the hub 38 (see FIG. 1). A helical tension spring 64 is attached to the free end of the longer arm of the bell crank lever 50 and to a pin 66 on the hub 38. The spring 64 tends to move the lever 50 from the position indicated by fully drawn lines in FIG. 3 to the position shown in broken lines.

The clutch arrangement illustrated in FIGS. 1 and 3 operates as follows:

In the position seen in FIG. 1, the clutch is disengaged. The friction facings 32 and 34 of the clutch disk 30 are axially spaced from the cooperating respective coupling faces 23, 37 of the clutch bowl 22 and pressure plate 36. As long as the speed of the engine 10 does not exceed a predetermined idling speed this condition is maintained.

When the engine is accelerated, the rotary speed of the clutch bowl 22 increases. The pressure plate 36 moves with the bowl 22 because of their threaded connection in a screwlike fashion unless forces greater than those of inertia move them relatively to each other. The increased engine speed is thus imparted to the disk 46, and the weight 50 is pivoted by centrifugal forces from the position illustrated in FIG. 3 in broken lines to the fully drawn position overcoming the tension of the return spring 64. The shorter lever arm 52 moves the end 54 of the spring 56 in such a manner as to tighten the turns of the spring about the sleeve 26 which is fixed on the shaft 24.

The shaft stands still, and the friction between the spring 56 and the sleeve 26 interferes with joint rotation of the hub 38 and flange 44. The friction effect between the spring 56 and the sleeve 26 is sufficient to overcome the friction in the threads 40, 42. The direction of the threads is such that rotation of the clutch bowl in the direction of the arrow in FIG. 3 under the driving force of the engine will move the pressure plate 36, which rotates at lower speed, axially toward the coupling face 23 of the clutch bowl 22 into frictional engagement with the friction facing 34 of the clutch disk 30. The disk which is fixed on the shaft 24 further brakes rotary movement of the pressure plate 36 with the clutch bowl 22 and accelerates the axial movement of the pressure plate into the fully engaged position in which the clutch disk 30 is compressed between the coupling faces of the bowl 22 and pressure plate 36.

Further relative movement of the driving clutch member (the bowl 22) and the driven clutch members, the pressure plate 36 and the shaft 24, is now impossible unless there be slippage along the friction facings 32, 34 and 23, 37. The contact pressure exerted by the cooperating coupling faces 23, 37 of the bowl 22 and of the plate 36 is proportional to the torque transmitted from the bowl to the shaft 24, the pitch of the threads 40, 42 entering into the factor of proportionality.

When the engine 10 is throttled and its speed decreases, the clutch is disengaged by the reversed sequence of the events which were described above. The greater rotary speed of the shaft 24 causes threaded movement of the hub 38 along the front face of flange 44 away from the clutch disk 30 since the speed of the hub is still sufficient to hold the centrifugal auxiliary clutch in the engaged position shown in fully drawn lines in FIG. 3. Disengagement between the shaft 24 and the clutch bowl 22 then permits a gear change in the power train of the vehicle of which the shaft 24 is the output shaft. When the engine is slowed down to the idling speed determined by the relationship between the force of the spring 64 and the centrifugal force generated by the weight 50, the auxiliary clutch is also disengaged.

Figure 2:
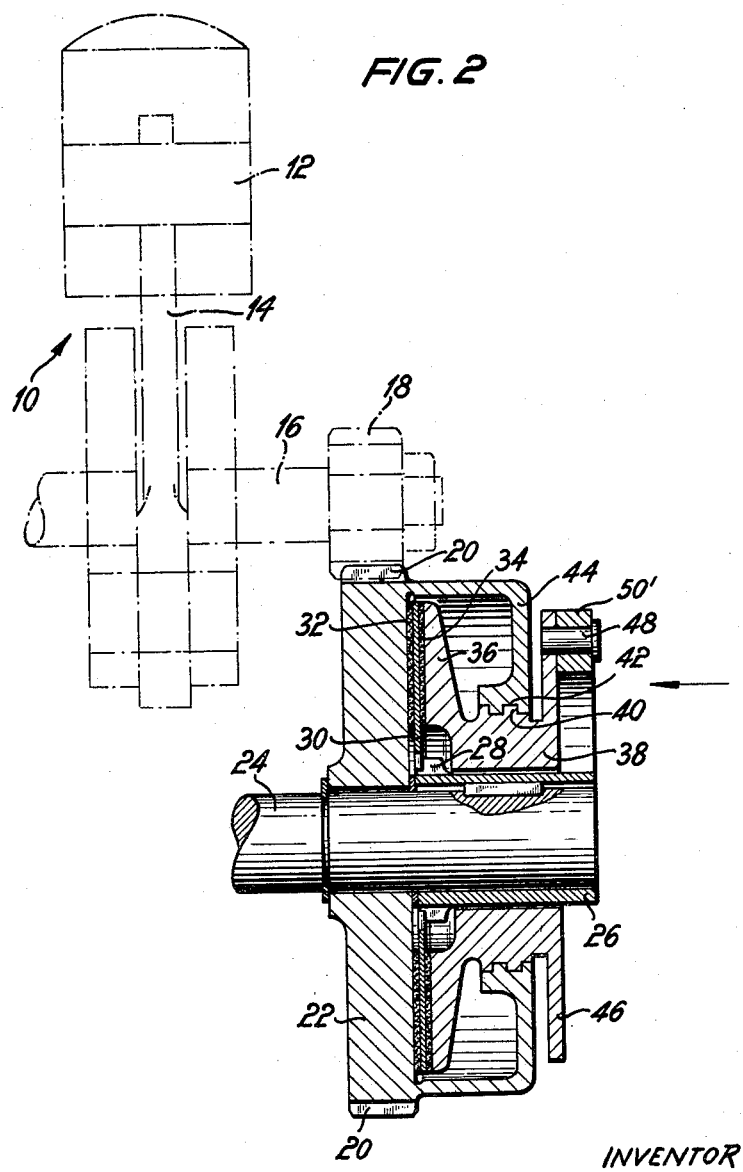
FIG. 2 illustrates a second embodiment of the clutch arrangement of the invention in a view corresponding to that of FIG. 1.
Figure 4:
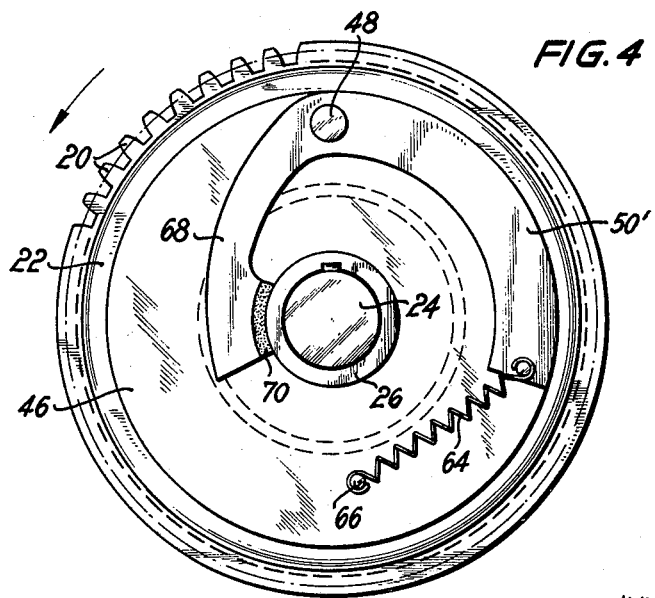
FIG. 4 is a view of the device of FIG. 2 corresponding to FIG. 3.

The embodiment of the invention illustrated in FIGS. 2 and 4 is substantially very similar to the aforedescribed clutch arrangement. It differs from the latter primarily in the auxiliary centrifugally actuated coupling, as will be best seen from FIG. 4.

The bell crank lever 50′ has a longer and heavier arm which is urged to move toward the center of rotation by the spring 64 in the manner discussed above. In the position illustrated, the centrifugal forces acting upon the weight 50′ are sufficient to overcome the restraining force of the spring 64. The shorter arm 68 of the lever 50′ is provided with a friction facing 70 which is urged into contact with the sleeve 26, thereby slowing or arresting the movement of the hub 38 relative to the shaft 24. The auxiliary coupling or clutch seen in FIG. 4 permits the clutch arrangement of the invention shown in FIGS. 2 and 4 to operate in the same manner as described in more detail in the above description of FIGS. 1 and 3. As viewed in FIG. 2, the modified clutch arrangement is in the engaged position.

It should be understood of course that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What I claim is:

1. A clutch arrangement, comprising a shaft having an axis, a first clutch member freely rotatable about said shaft, a second clutch member axially slidable on said shaft and secured against rotation relative to said shaft, a pressure member freely rotatable about said shaft and axially movable thereon toward and away from a position in which said pressure member urges said second clutch member into a motion-receiving engagement with said first clutch member, complementary connecting means immediately on said first clutch member and said pressure member for selectively permitting said pressure member to idly rotate together with said first clutch member, and making said pressure member move in an axial screwlike motion toward said second clutch member and force the latter into said motion-receiving engagement, and centrifugal coupling means mounted on said pressure member to be responsive to the rotary speed of said first clutch member for selectively effecting said idle rotation of said pressure member, while said clutch members are disengaged, and connecting said pressure member to said shaft, while making said pressure member carry out said axial screwlike movement for joint rotation of said clutch members, pressure member, and shaft.

2. In the clutch arrangement according to claim 1, said complementary connecting means being constituted by mating threads on said first clutch member and said pressure member, said threads having a direction to cause a developed driving force, when the rotary speed of said first clutch member exceeds a predetermined value, to move said pressure member against said second clutch member.

3. In the clutch arrangement according to claim 1, said first clutch member being bowl-shaped and having a bottom and an inwardly turned rim flange, said bottom and rim flange defining a cavity, the inner face of said bottom being formed as a friction face of said first clutch member, said pressure member being formed to include a hub, a pressure plate extending away from the hub at one end thereof, and a disk extending away from the other hub end, said pressure plate and at least a portion of said hub being disposed within said cavity.

4. In the clutch member according to claim 3, a sleeve fixedly mounted on said shaft and slidably and freely rotatably supporting said pressure member, said hub being provided with an external thread, said rim flange having a front face provided with a mating thread.

5. In the clutch arrangement according to claim 1, a sleeve fixedly mounted on said shaft, said coupling means including centrifugal weight means mounted on said pressure member for pivotal movements, and resilient means selectively frictionally connecting, and leaving disconnected, said pressure member and sleeve, said weight means acting upon said resilient means to effect connection between said pressure member and sleeve when the rotary speed of said first clutch member exceeds a predetermined value.

6. In the clutch member according to claim 1, a sleeve fixedly mounted on said shaft, said coupling means including centrifugal weight means pivotally mounted on said pressure member, and a friction member on said weight means, said friction member selectively frictionally connecting, and leaving disconnected, said pressure member and sleeve, said weight means acting upon said friction member to effect said frictional connection between said pressure member and sleeve when the rotary speed of said first clutch member exceeds a predetermined value.

(References on following page)

References Cited by the Examiner

UNITED STATES PATENTS

| | | | |
|---|---|---|---|
| 1,881,941 | 10/32 | Putney. | |
| 2,074,476 | 3/37 | Kolb | 192—35 X |
| 2,253,716 | 8/41 | Martin | 192—94 X |
| 2,364,019 | 11/44 | Beall | 192—54 |
| 2,881,890 | 4/59 | Welch | 192—94 X |
| 2,954,109 | 9/60 | Jardine. | |

FOREIGN PATENTS

| | | |
|---|---|---|
| 544,649 | 2/32 | Germany. |
| 208,363 | 12/23 | Great Britain. |

DAVID J. WILLIAMOWSKI, *Primary Examiner.*

THOMAS J. HICKEY, *Examiner.*